United States Patent [19]

Kitayama et al.

[11] Patent Number: 4,754,290

[45] Date of Patent: Jun. 28, 1988

[54] PRINTING APPARATUS EQUIPPED WITH A LOADING MECHANISM FOR AN INKSHEET CASSETTE

[75] Inventors: Toshihiko Kitayama; Ryuzo Une, both of Fukuyama, Japan

[73] Assignee: Mitsubishi Denki Kabushiki Kaisha, Japan

[21] Appl. No.: 37,146

[22] Filed: Apr. 10, 1987

[30] Foreign Application Priority Data

Apr. 11, 1986 [JP] Japan .................................. 61-55017

[51] Int. Cl.[4] .............................................. G01D 15/10

[52] U.S. Cl. ............................... 346/76 PH; 219/216; 400/120; 400/194; 400/196; 400/207; 400/208; 400/208.1

[58] Field of Search ................. 346/1.1, 76 PH, 76 R, 346/145; 400/120, 194, 195, 196, 196.1, 207, 208, 208.1; 219/216, 216 PH

[56] References Cited

U.S. PATENT DOCUMENTS 4,505,603 3/1985 Yana .................................... 400/120
4,527,172 7/1985 Nagashima et al. ................ 346/145
4,632,585 12/1986 Oyamatsu et al. .................. 400/120

FOREIGN PATENT DOCUMENTS 0064379 4/1984 Japan .................................. 400/120
0064369 4/1984 Japan .................................. 400/120
0092886 5/1985 Japan .................................. 400/120

OTHER PUBLICATIONS

IBM Tech. Discl., "Carrier for Ribbon Cartridge", vol. 23, No. 4, 9/80.

*Primary Examiner*—E. A. Goldberg
*Assistant Examiner*—Huan H. Tran
*Attorney, Agent, or Firm*—Leydig, Voit & Mayer

[57] ABSTRACT

A shell-type printing apparatus is equipped with a link mechanism for loading and unloading an inksheet cassette from the printing apparatus. The link mechanism comprises a support frame which supports an inksheet cassette and two pairs of links which have one end pivotably mounted on the base of the printing apparatus and the other end pivotably connected to the support frame. The link mechanism rotates the support frame between a first and a second position. In the first position, the support frame is disposed above and to the front of the base of the printing apparatus so that an inksheet cassette can be mounted on the support frame. In the second position, the support frame is disposed inside the base and the inksheet cassette is disposed in the proper position for printing.

5 Claims, 4 Drawing Sheets

PRINTING APPARATUS EQUIPPED WITH A LOADING MECHANISM FOR AN INKSHEET CASSETTE

BACKGROUND OF THE INVENTION

This invention relates to a printing apparatus equipped with a loading mechanism for loading and unloading inksheet cassette from the printing apparatus. More particularly but not exclusively. it relates to a thermal transfer printer of the so-called shell type which is equipped with such a loading mechanism.

FIG. 1 is a schematic profile of a conventional shell-type thermal transfer printer of the type to which the present invention relates. As shown in the figure, a shell-type printer has a box-like base 1 and a cover 3 which is pivotably supported by pins 2 which are secured to the rear end of the base 1. The base 1 has a thermal print head 5 mounted therein, while the cover 3 supports a platen 6 and pinch rollers *7a* and *7b* which are disposed on either side of the platen 6. A paper supply cassette 8 for recording paper and a paper discharge tray 9 are secured to the cover 3. The base 1 houses a removable inksheet cassette 10, the structure of which is shown in detail in FIG. 2. The inksheet cassette 10 has a 4-sided cassette case 14 whose top and bottom are open. A supply roller 11 and a take-up roller are rotatably mounted inside the case 14, and an inksheet 13 is wrapped around these rollers. Two pairs of studs 15 and 16 project outwards from opposite sides of the case 14. These studs 15 and 16 fit into corresponding notches formed in two pairs of positioning plates 17 and 18 which are secured to the base 1 on opposite sides thereof.

The thermal print head 5 and the platen 6 are respectively secured to the base 1 and the cover 3 so that when the cover 3 is closed, the platen 6 will confront the print head 5 in close proximity thereto. Furthermore, the positioning plates 17 and 18 are positioned such that when an inksheet cassette 10 is mounted thereon and the cover 3 is closed the inksheet 13 of the cassette 10 will lie between the print head 5 and the platen 6. During printing, as illustrated in FIG. 3, recording paper 19 is supplied from the paper supply cassette 8 and passes through the space between the inksheet 13 and the platen 6. At the same time, the inksheet 13 is transferred from the supply roller 11 to the take-up roller 12 in the direction shown by the arrows in the figure.

In a conventional shell-type printer of this type, the inksheet cassette 10 must be loaded into the base 1 of the printer entirely by hand. As shown in FIG. 1, the inksheet cassette 10 must be lowered into the base 1 from above by hand until the studs 15 and 16 fit into the notches in the positioning plates 17 and 18. The process of inserting the cassette 10 into the base 1 and guiding it by eye onto the positioning plates 17 and 18 is made difficult by the fact that the cover 3 can be opened by only a relatively small angle with respect to the base 1. Because of the limited space between the top of the base 1 an the cover 3, during loading or unloading of the cassette 10, it is easy to inadvertently strike it against one of the fragile parts of the printer, such as the thermal head 5, thereby damaging the printer.

With other types of printers, it is conceivable to insert an inksheet cassette horizontally into the base while guiding the cassette with guide rails or other type of guide mechanism. However, with a shell-type printer, due to the position of the thermal head, it is mandatory that an inksheet cassette be inserted from above, and therefore simple guide rails are difficult to adapt to a printer of this type.

SUMMARY OF THE INVENTION

It is an object of the present invention to provide a printing apparatus which is equipped with a loading mechanism which enables an inksheet cassette to be easily and safely loaded into and unloaded from the printing apparatus without any possible damage thereto.

On form of printing apparatus according to the present invention is equipped with a cassette loading mechanism in the form of a link mechanism which can move an inksheet cassette from a first position in which the inksheet is disposed with at least its front end above the base of the printing apparatus to a second position in which it is disposed inside the base in a position suitable for printing. The link mechanism preferably comprises a support rame which can support an inksheet cassette, a pair of front links which can each have one pivotably mounted on the base and the other end pivotably connected to the support frame, and a pair of rear links which each have one end pivotably mounted on the base and the other end pivotably connected to the support frame to the rear of the front links. An inksheet cassette which is mounted on the support frame can be moved from the first position to the second position by manually rotating thelink mechanism.

BRIEF DESCRIPTION OF THE DRAWINGS

In the drawings, the same reference numerals indicate the same or corresponding parts.

DESCRIPTION OF THE PREFERRED EMBODIMENTS

Figure 1:
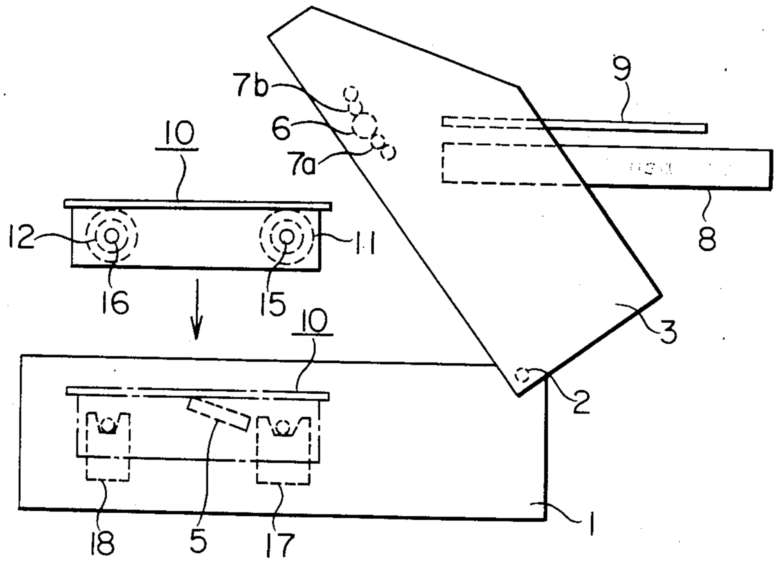
FIG. 1 PRIOR ART
FIG. 1 is a schematic side view of a conventional shell-type thermal transfer printer.
Figure 2:
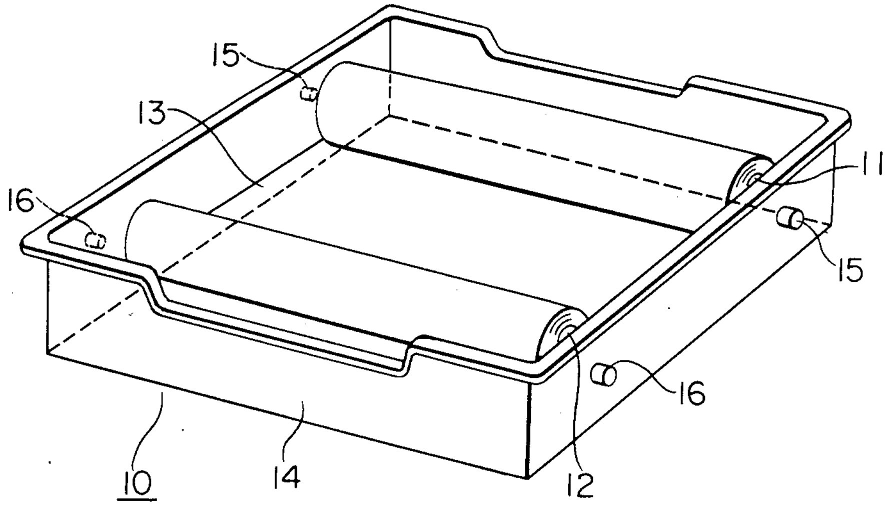
FIG. 2 PRIOR ART
FIG. 2 is a perspective view of an inksheet cassette for the printer of FIG. 1.
Figure 4:
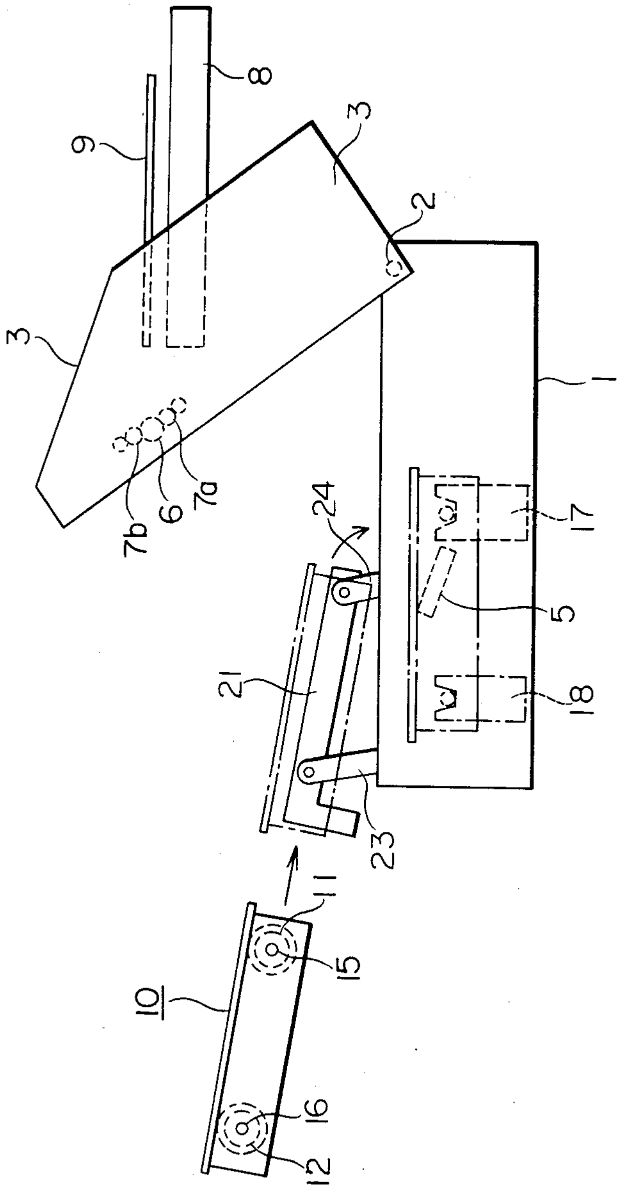
FIG. 4 is a schematic side view of an embodiment of a thermal transfer printer in accordance with the present invention, illustrating the manner of loading an inksheet cassette into the printer.
Figure 5:
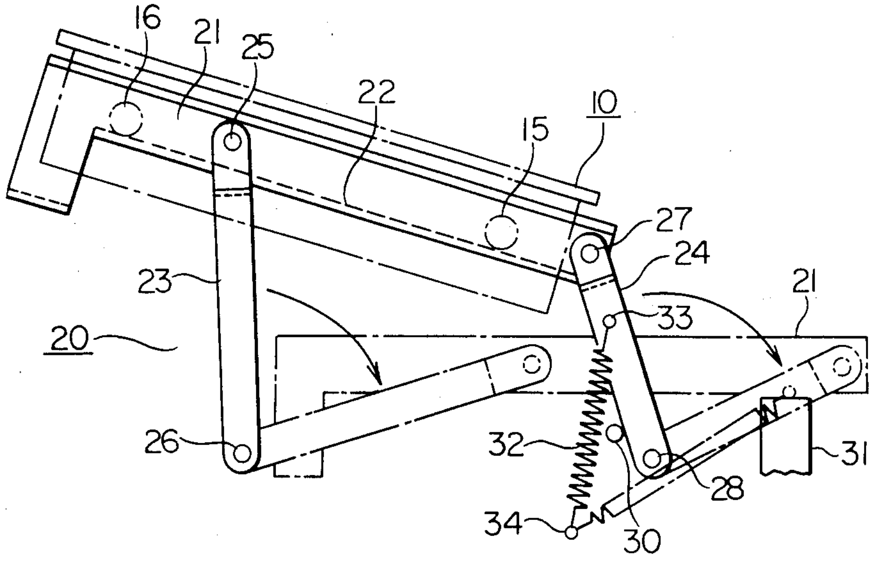
FIG. 5 is a side view of the link mechanism of the embodiment of FIG. 4, illustrating the movement of the link mechanism when an inksheet cassette is being loaded into the printer.
Figure 6:
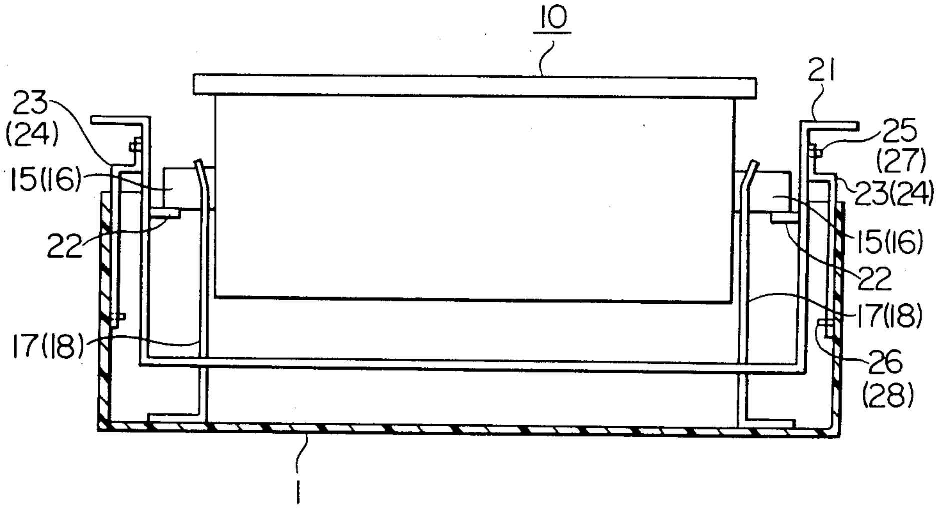
FIG. 6 is a front cross-sectional view of the embodiment of FIG. 4, showing an inksheet cassette mounted insdie the base of the printer.

Hereinbelow, an embodiment of a printing apparatus in accordance with the present invention will be described while referring to FIGS. 4 through 6 of the accompanying drawings. As shown in FIG. 4, the overall structure of this embodiment is similar to that of the conventional printer shown in FIG. 1. Namely, a cover 3 is pivotably mounted on pins 2 which are secure to the rear end of a box-shaped base 1. The base 1 supports a thermal print head 5 and two pairs of positioning plates 17 and 18 which confront one another from opposite side of the base 1 and are secured to the bottom thereof. The plates 17 and 18 have notches formed therein into which fit the studs 15 and 16, respectively, of a conventional inksheet cassette 10. The cover 3 of the printer supports a platen 6, two sets of pinch rollers 7a and 7b, a paper supply cassette 8, and a paper discharge tray 9. The base 1 is further equipped with a cassette loading mechanism in the form of a link mechanism 20 comprising a cassette support frame 21, a pair of front links 23, and a pair of rear links 24. The structure of the link mechanism is best shown in FIGS. 5 and 6. The cassette support frame 21 is a rigid frame having two parallel flanges 22 formed on its inner surface. The flanges 22 can support an inksheet cassette 10 by the studs 15 and 16 thereof. Two crank-shaped front links 23 are disposed on opposite sides of the base 1. The front links 23 each have one end pivotably mounted on pins 26 which extend from the inner sides of the base 1, while the other ends of the front links 23 are pivoted on pins 25 which extend from opposite sides of the support frame 21. Similarly, two crank-shaped rear links 24 each have one end pivotably mounted on pins 28 which extend from the inner sides of the base 1, while the other ends are pivoted on pins 27 which extend from opposite sides of the support frame 21 to the rear of pins 25. The rear links 24 are shorter than the front links. The degree of pivoting of the link mechanism 20 towards the front of the base 1 is limited by stop pins 30 which are secured to the base 1 and contact the rear links 24 when they reach a certain position. The pivoting of the link mechanism 20 towards the rear of the base 1 is limited when pins 33 secured to the rear links 24 contact rigid stop plates 31 which are secured to the base 1. A tensile spring 32 is connected between one of the pins 33 on the rear links 24 and another pin 34 which is secured to the base 1.

The operation of the link mechanism 20 is as follows. When an inksheet cassette 10 is to be loaded into the printer, the link mechanism 20 is rotated by hand to a first position shown by the solid lines in FIGS. 4 and 5. In this first position, the rear links 24 contact the stop pins 30 and the link mechanism 20 is thereby prevented from any further forward movement. At the same time, the tensile spring 32 exerts a biasing force on the link mechanism 20 in the forward direction so as to prevent its being inadvertently rotated backwards. Because the front links 23 are chosen to be longer than the rear links 24, in the first position, the cassette support frame 21 will be sloped with respect to the horizontal. When the cassette support frame 21 is in this position, the inksheet cassette 10 is then inserted into the support frame 21 with the studs 15 and 16 being supported by the flanges 22 on either side of the frame 21.

Figure 3:
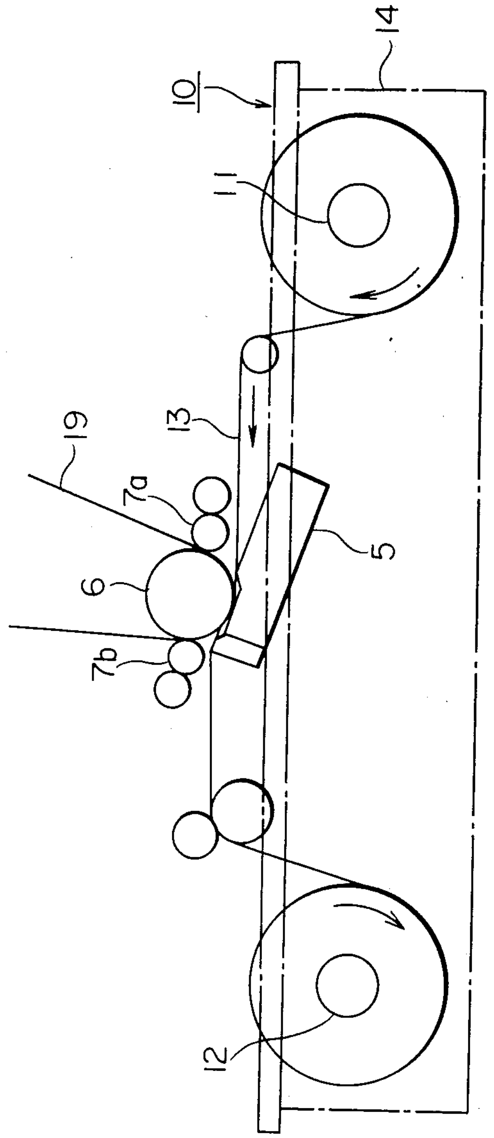
FIG. 3 PRIOR ART
FIG. 3 is a schematic side view of the inksheet cassette of FIG. 2 during printing using a shell-type thermal transfer printer.

The link mechanism 20 is then rotated by hand against the biasing force of the tensile spring 32 resulting in the cassette suspport and cassette being translated inwardly and downwardly from the first position to a second position in which the cassette support frame 21 is horizontal and the pins 33 on the rear links 24 are supported by the stop plates 31. This second position is shown by the dashed lines in FIG. 5. When the link mechanism 20 is in this second position, the studs 15 and 16 of the inksheet cassette 10 fit into the notches in the corresponding positioning plates 17 and 18 and the cassette 10 is disposed in the correct position for printing. When the cover 3 of the printer is closed, the inksheet 13 of the inksheet cassette 10 is sandwiched between the print head 5 and the platen 6, in the same manner as shown in FIG. 3.

When the inksheet cassette 10 is to be removed from the base 1, the link mechanism 20 is simply rotated by hand from the second position to the first position, whereby the support frame 21 lifts the inksheet cassette 10 out of the base 1 and moves it to the first position where it can be easily removed from the support frame 21.

Thus, the link mechanism 20 makes it possible to easily load and unload an inksheet cassette 10 without striking any parts of the printer, even when the cover 3 is open by only a small angle. Although it is not mandatory that the rear links 24 of the link mechanism 20 be shorter than the front links 23, making them such has the advantage that the rear end of the support frame 21 is lower than the front end when the link mechanism 20 is in the first position, and the rearward movement of the rear end of the support frame 21 when the link mechanism is rotated to the second position is less than if the front and rear links were of the same length. Accordingly, the angle by which the cover 3 need be opened in order to load the inksheet cassette 10 is reduced.

In FIG. 4, when the support frame is in the first position, the inksheet cassette 10 is shown as being entirely above the upper edge of the base 1 of the printer. However, so long as the inksheet cassette 10 can be easily placed onto and removed from the support frame 21, it is not necessary for the entirety of the inksheet cassette 21 to be outside of the base 1 when the support frame is in the first position.

In the above-described embodiment, the print head 5 is mounted on the base 1 of the printer, while the platen 6 and the pinch rollers 7a and 7b are mounted within the cover 3, but it is also possible for the cover 3 to support the thermal print head 5 and for the base 1 to support the platen 6 and the pinch rollers 7a and 7b.

What is claimed is:

1. A shell-type printing apparatus comprising:

a box-shaped base;

a cover which is pivotably mounted on the rear end of said base to provide a restricted areea between said cover and said base for insertion and removal of an inksheet cassette from said printing apparatus;

a platen and a print head, one of which is supported by said base and the other of which is supported by said cover in a manner such that when said cover is closed, said platen and said print head confront one another in close proximity;

an inksheet cassette which contains an inksheet; and cassette loading means mounted on said base for loading and unloading of said inksheet cassette, the cassette loading means including cassette support means for receiving and supporting said inksheet cassette and having a first position in which the cassette support means is accessible from outside the restricted area for allowing insertion or removal of said inksheet cassette and a second position in which said inksheet cassette is in an operational position disposed between said platen and said printhead when said cover is closed, the cassette loading means further including means for translating said cassette support means with supported inksheet cassette from said first position inwardly and downwardly through said restricted space to said second position along a defined path free from interference with said cover and base.

2. A printing apparatus as claimed in claim 1 wherein said cassette loading means includes a link mechanism coupled to said cassette support means, the link mechanism comprising a pair of front links, each of which has one end pivotably connected to said base and the other end pivotably connected to said support means, and a pair of rear links, each of which has one end pivotably connected to said base and the other end pivotably connected to said support means to the rear of said front links, said support means being translated between said first position and said second position by the pivoting motion of said front and rear links.

3. A printing apparatus as claimed in claim 2 wherein said front links are longer than said rear links and said front and rear links are pivotably connected to said base such that said support means is sloped with respect to the horizontal when it is in said first position.

4. A printing apparatus as claimed in claim 2, further comprising biasing means for biasing said link mechanism towards said first position.

5. A printing apparatus as claimed in claim 4, wherein said biasing means comprises a tensile spring which is connectd between said base and one of said rear links.

* * * * *